United States Patent
Hasegawa et al.

(10) Patent No.: US 7,078,992 B2
(45) Date of Patent: Jul. 18, 2006

(54) ROTARY SOLENOID

(75) Inventors: Motonobu Hasegawa, Kariya (JP);
Yasushi Miura, Ohbu (JP); Masahiro Yoshida, Chiryu (JP); Hirosi Tachiki, Anjo (JP); Norikazu Tochizawa, Iwate-ken (JP); Akihiro Chiba, Iwate-ken (JP); Hisashi Hashimoto, Ichinoseki (JP); Masahiro Suzuki, Iwate-ken (JP)

(73) Assignees: Aisin Seiki Kabushiki Kaisha, Kariya (JP); Aisin Tohoku Co., Ltd., Awate-ken (JP)

( * ) Notice: Subject to any disclaimer, the term of this patent is extended or adjusted under 35 U.S.C. 154(b) by 127 days.

(21) Appl. No.: 10/742,862

(22) Filed: Dec. 23, 2003

(65) Prior Publication Data
US 2004/0212469 A1    Oct. 28, 2004

(30) Foreign Application Priority Data
Dec. 24, 2002    (JP) ............................. 2002-373005

(51) Int. Cl.
*H01F 7/08* (2006.01)
(52) U.S. Cl. ...................................... 335/220; 335/225
(58) Field of Classification Search ........ 335/220–229; 310/40 R
See application file for complete search history.

(56) References Cited

U.S. PATENT DOCUMENTS

| | | | | |
|---|---|---|---|---|
| 4,103,191 A | * | 7/1978 | Kawamura et al. | 310/49 R |
| 6,950,002 B1 | * | 9/2005 | Sano | 336/83 |
| 2004/0155742 A1 | * | 8/2004 | Hasegawa et al. | 335/220 |

FOREIGN PATENT DOCUMENTS

| JP | 9-154267 | 6/1997 |
|---|---|---|
| JP | 2002-341927 | 12/2000 |

* cited by examiner

*Primary Examiner*—Elvin Enad
*Assistant Examiner*—Bernard Rojas
(74) *Attorney, Agent, or Firm*—Buchanan Ingersoll PC

(57) ABSTRACT

A rotary solenoid for stabilizing performance is provided. A rotary solenoid 10 includes a pair of the first yoke 21 and the second yoke 22 placed oppositely in a rotor 24 providing a pair of magnetic poles by a permanent magnet, a core 23 enclosed by the first yoke 21 and the second yoke 22, and a coil 25 wound around the core 23 and forming a pair of magnetic poles in the first yoke 21 and the second yoke 22 by supplying electricity. These first yoke 21, second yoke 22, core 23, and coil 25 are resin-molded. A projecting portion 26a is provided in an outer surface on the opposite side of enclosing the core 23 by the first yoke 21 and the second yoke 22.

14 Claims, 6 Drawing Sheets

FIG. 5A
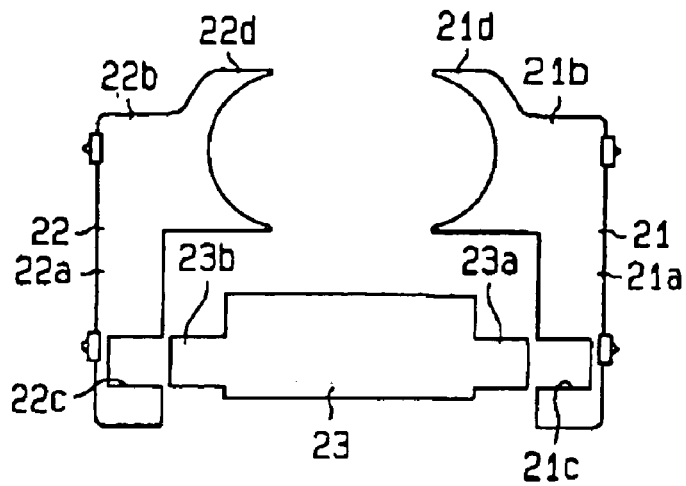
FIG. 5B
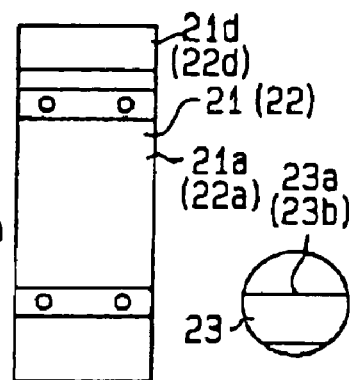
FIG. 5C
FIG. 6A
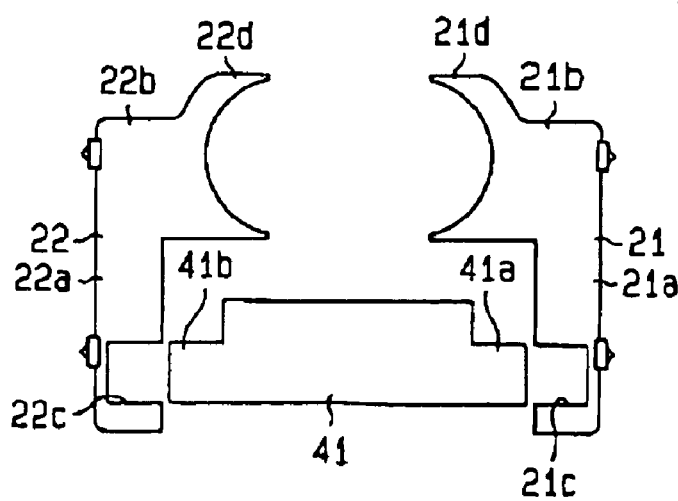
FIG. 6B
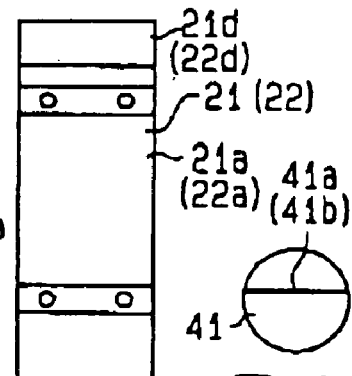
FIG. 6C FIG. 7A
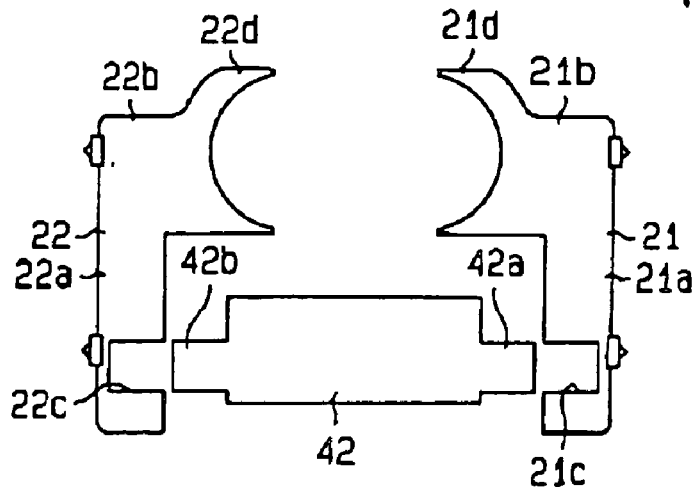
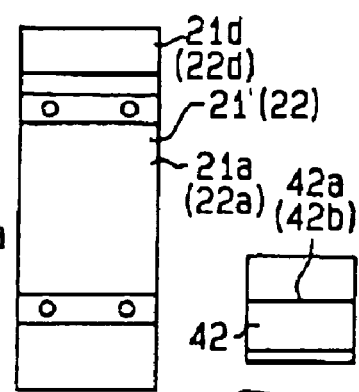
FIG. 8 PRIOR ART
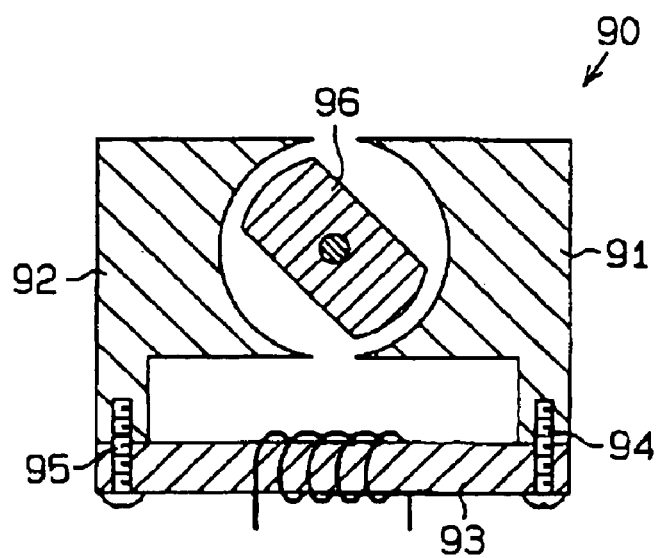

ROTARY SOLENOID

This application is based on and claims priority under 35 U.S.C. § 119 with respect to Japanese Patent Application 2002-373005 filed on Dec. 24, 2002, the entire contents of which are incorporated herein by reference.

BACKGROUND OF THE INVENTION

1. Field of the Invention

The present invention relates to a rotary solenoid.

2. Description of the Related Art

Conventionally, a rotary solenoid has been known and disclosed, for example, in a Japanese Patent Application Laid-Open Publication No. 9-154267. The rotary solenoid described in this patent publication as a conventional device has a yoke 90 which is divided into three parts such as a first yoke 91, a second yoke 92, and a core 93 around which a coil is wound as shown in FIG. 8. Then, one end and the other end terminals of the core 93 are fastened to the first yoke 91 and the second yoke 92 using fixation screws 94 and 95, respectively.

In such a structure, two fixation screws 94 and 95 are required for assembling and then the number of part increase is unavoidable. Further, a screw hole for each screw shall be processed and then assembling man-hour increase is also unavoidable. Then, the cost increases due to increase of the number of part and assembling man-hour.

Further, since the positions of the first and second yokes 91 and 92 fluctuate, an air gap (clearance) of a rotor 96 facing them becomes ununiform and then quality and performance will be degraded.

Further, the rotary solenoid described in the above patent application publication as a preferred embodiment, has a yoke 100, which is divided into two parts, a first yoke 101, and a second yoke 102 as shown in FIG. 9. A core is formed, on which the coil is wound around a part of the first yoke 101 and the second yoke 102. Then, thus divided first yoke 101 and the second yoke 102 are fixed by two shaft bearing plates 104 and 105 for pivotally supporting a shaft 103.

However, even if such a structure is employed, the number of part increases and the cost increases. Further, since the first yoke 101 and the second yoke 102 shall be seized by two shaft bearing plates 104 and 105, the size of the rotary solenoid shall be increased.

As another conventional rotary solenoid, the solenoid described in a Japanese Patent Application Laid-Open Publication No. 2000-341927, for example, is also known. The rotary solenoid described in this patent publication includes a pair of right and left yokes and a core, on which the coil is wound around, seized by them. The rotary solenoid is structured by integrally resin-molding both yokes and the core.

However, since both yokes and the core are different parts, their positions may be displaced when they are set in a die for resin-molding. Then, since a contact portion between each yoke and the core is easily displaced, performance is degraded due to a gap caused by this displacement, for example.

Further, if the positions of circular arc portions 51 and 52 of the yoke are displaced, the air gap (clearance) of the rotor becomes ununiform, and then quality and performance are degraded.

SUMMARY OF THE INVENTION

The object of the present invention is to provide a rotary solenoid capable of stabilizing performance.

In order to solve the foregoing problems, according to an aspect of the present invention, the rotary solenoid includes a pair of a first yoke and a second yoke placed oppositely in a rotor providing a pair of magnetic poles by a permanent magnet, a core seized by the first yoke and the second yoke, and a coil wound around the core and forming a pair of magnetic poles in the first yoke and the second yoke by supplying electricity, where these first yoke, second yoke, core, and coil are resin-molded, in which each of projecting portions is provided in each outer surface on the opposite side of enclosing the above-mentioned core by the above-mentioned first yoke and the above-mentioned second yoke.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5A is a front view of decomposed parts of the same embodiment;

FIG. 5B is a side view of decomposed parts of the same embodiment;

FIG. 5C is a side view of the core of the same embodiment;

FIG. 6A is a front view of decomposed parts of another embodiment;

FIG. 6B is a side view of decomposed parts of another embodiment;

FIG. 6C is a side view of the core of another embodiment;

FIG. 7A is a front view of decomposed parts of the other embodiment;

FIG. 7B is a side view of decomposed parts of the other embodiment;

FIG. 7C is a side view of the core of the other embodiment;

FIG. 8 is a sectional view of a conventional embodiment; and

DESCRIPTION OF THE PREFERRED EMBODIMENTS

In the following part, embodiments exemplified the present invention are explained with reference to FIGS. 1A to 5B.

FIG. 1A indicates a top view of a rotary solenoid 10. FIG. 1B indicates a side view of a rotary solenoid 10. They are indicated without a resin case of a resin mold for the convenience of explanation. Further, FIG. 2 is a front view of the rotary solenoid 10.

Figure 1:
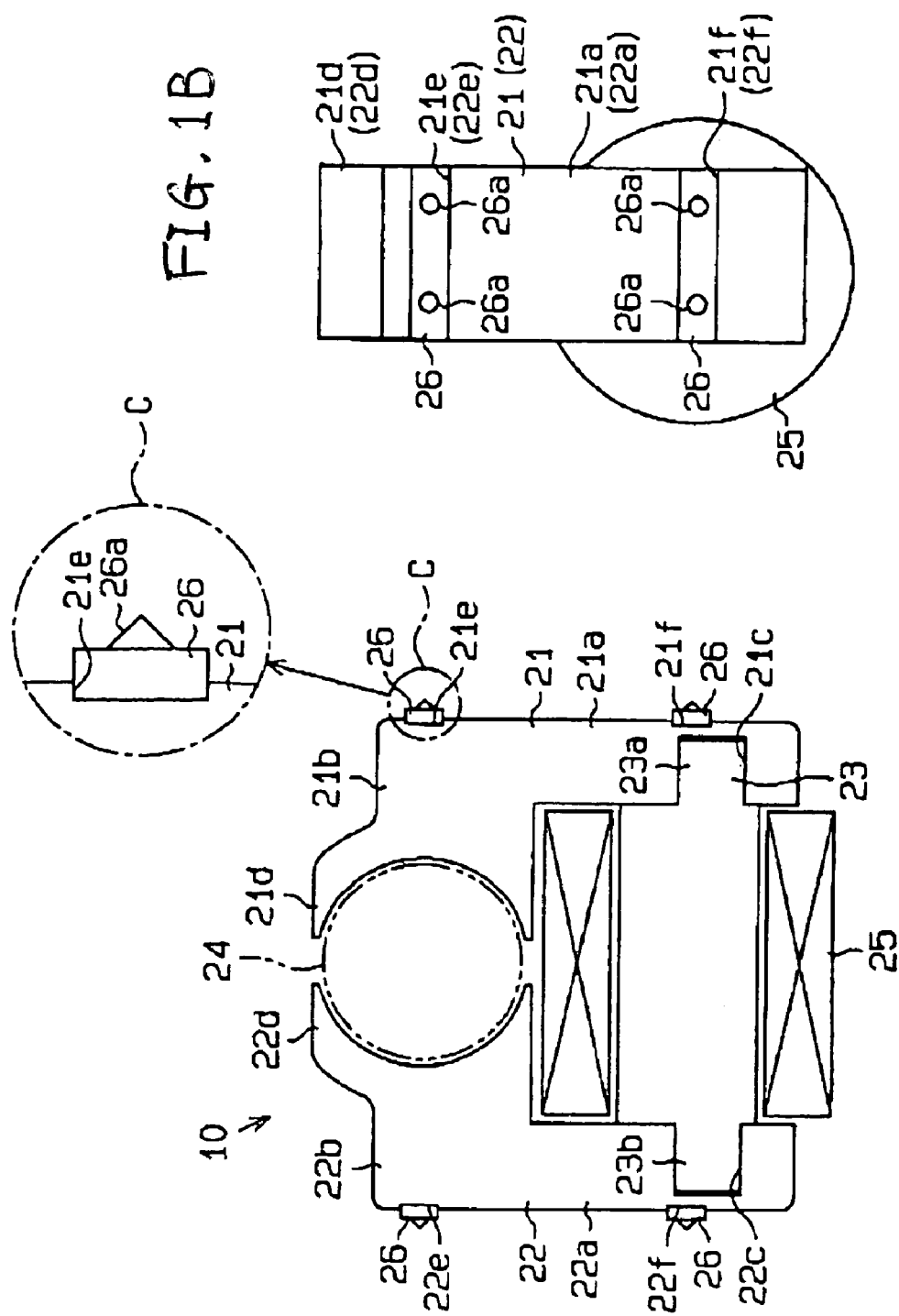
FIG. 1A is a front view of one embodiment of the present invention.
FIG. 1B is a side view of one embodiment of the present invention.
Figure 2:
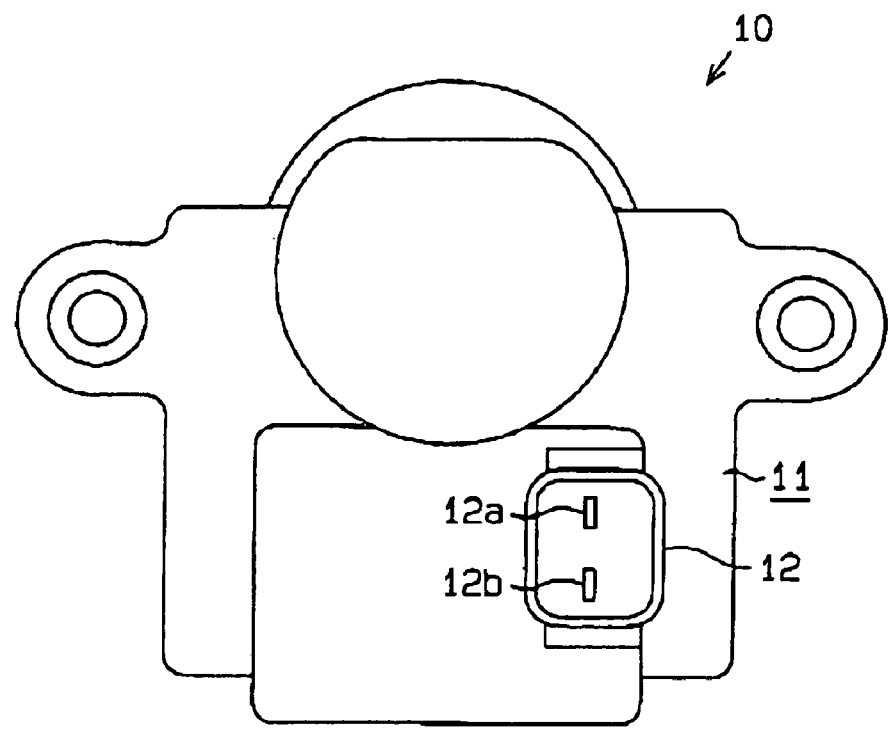
FIG. 2 is a front view of the embodiment.

As shown in FIG. 2, the outer periphery portion of the rotary solenoid 10 is covered by a resin case 11 which is resin-molded by a resin material as a non-magnetic material. Further, electricity supply terminals 12a and 12b are exposed from a connector portion 12 integrally molded in the resin case 11.

As shown in FIGS. 1A and 1B, the rotary solenoid 10 includes a pair of the first yoke 21 and the second yoke 22 having nearly the same shape with each other and a core 23 inserted between these first and second yokes 21 and 22. The first and second yokes 21 and 22 with high magnetic permeability include arm portions 21a and 22a extending towards the one side direction (upward and downward directions of FIGS. 1A and 1B) respectively and facing portions 21b and 22b extending towards the facing directions with each other from each top terminal side (upper side of FIGS. 1A and 1B) of the arm portions 21a and 22a.

The first and second yokes 21 and 22 are placed nearly symmetrically. Notches 21c and 22c formed into concave shapes towards the outsides from the facing surfaces are formed in respective base terminal sides (lower sides of FIGS. 1A and 1B) of arm portions 21a and 22a. These notches 21c and 22c penetrate in the orthogonal direction of a drawing paper. On the other hand, convex portions 23a and 23b formed in one side and the other side (right hand side and left hand side of FIGS. 1A and 1B) in a protruding way corresponding to the above-mentioned notches 21c and 22c are formed in the core 23 having nearly a cylindrical shape made of a high magnetic permeability material. As also indicated in FIGS. 5A, 5B, and 5C, these convex portions 23a and 23b are formed by cutting toward two directions nearly parallel with each other which are nearly perpendicular with the axial line in each end portion of the cylindrical body. Therefore, these convex portions 23a and 23b have two flat-face widths. The core 23 is positioned between the first and second yokes 21 and 22 by the above-mentioned convex portions 23a and 23b being inserted in the notches 21c and 22c. Here, in this positioned condition, a slight gap is formed between the facing area (bottom face) of the notches 21c and 22c and the end area of the convex portions 23a and 23b. This structure is designed for assuring a contact condition between a facing area of the first and second yokes 21 and 22 and the end face area of the core 23 at base end sides of the convex portions 23a and 23b.

Further, circular arc portions 21d and 22d forming nearly circular shapes are formed in respective top end portions of the above-mentioned facing portions 21b and 22b. A rotor 24, the axial line of which extends in the orthogonal direction toward the drawing paper, is positioned in a rotary way with having a predetermined gap between these circular arc portions 21d and 22d. A pair of permanent magnets having reversed polarity with each other (N pole and S pole) is fixed to the outer periphery portion of this rotor 24 in such a way that the outer periphery portion is nearly bisected.

In the above-mentioned core 23, a coil 25 is wound. This coil 25 is to generate a magnetic field in an air gap as a magnetic path among the first yoke 21, the second yoke 22, the core 23, and the circular arc portions 21d and 22d. That is to say, the coil 25 generates the N pole and the S pole respectively in the circular arc portions 21d and 22d by current-carrying via the above-mentioned electric power supply terminals 12a and 12b so as to rotate and drive the above-mentioned rotor 24 to which a permanent magnet is fixed.

Figure 4:
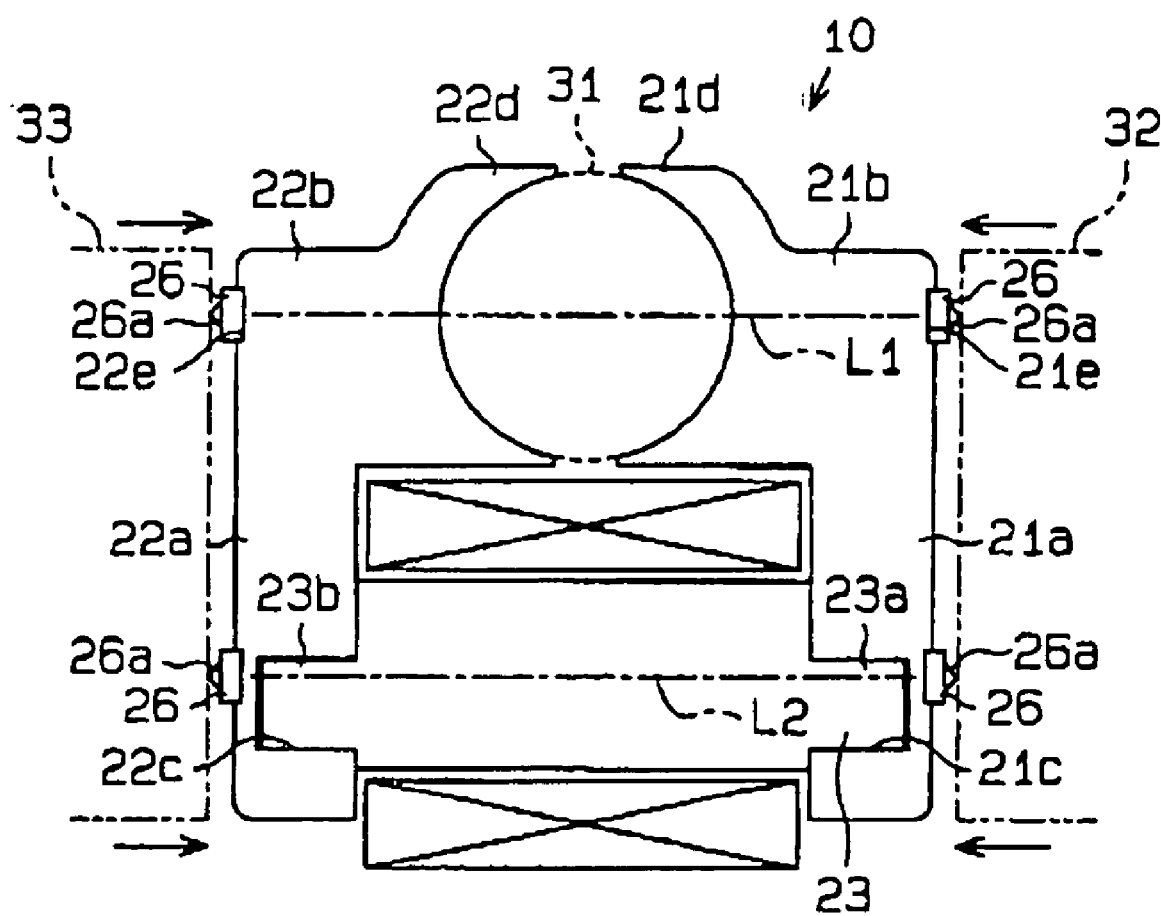
FIG. 4 is an explanatory view for explaining the operation of the embodiment.
Figure 9:
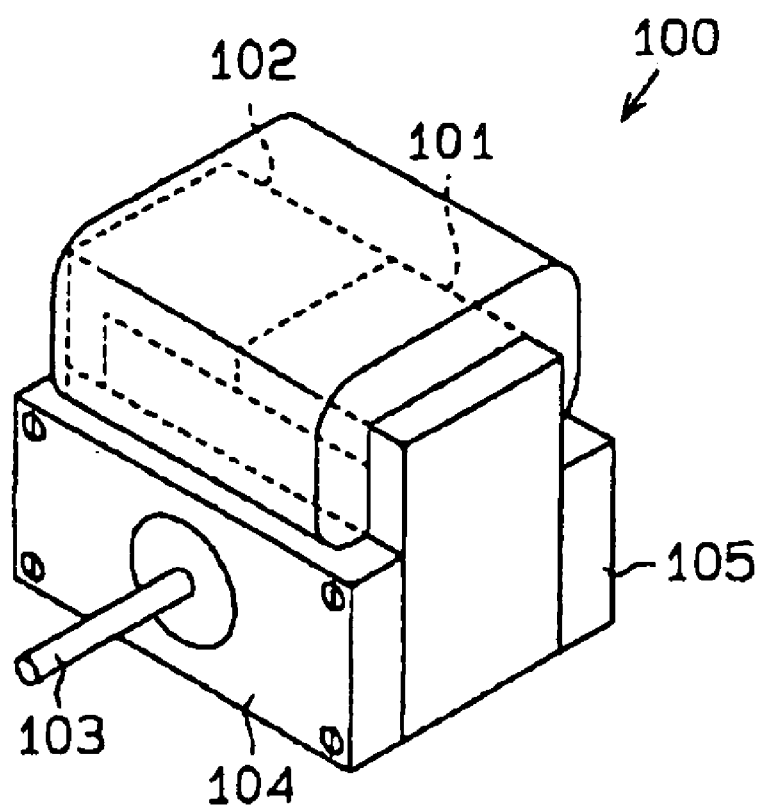
FIG. 9 is a perspective view of another conventional embodiment.

Here, each of mounting grooves 21e and 22e, which is concave-formed nearly in a "U" character shape toward the inside, is formed in each outer side of the top end sides (upper portions of FIGS. 1A and 1B) of the arm portions 21a and 22a. As indicated in FIG. 4, these mounting grooves 21e and 22e are formed in such a way that a straight line L1 connecting their central portions passes through a center of a circle formed by the above-mentioned circular arc portions 21d and 22d. Further, each of mounting grooves 21f and 22f, which is concave-formed nearly in a "U" character shape toward the inside, is formed in each outside portion of base ends (lower sides of FIGS. 1A and 1B) of arm portions 21a and 22a. As indicated in FIG. 4, these mounting grooves 21f and 22f are formed in such a way that a straight line L2 connecting their central portions passes through the above-mentioned convex portions 23a and 23b. These mounting grooves 21e, 21f, 22e, and 22f penetrate in the orthogonal direction of the drawing paper. Further, each mounting pad 26 made of resin which has an outer wall for each mounting groove and is formed nearly in a band shape is mounted in each of mounting grooves 21e, 21f, 22e, and 22f. As indicated in a magnified region C of FIG. 1A, plural (two) projecting portions 26a having conical shapes are formed at regular intervals.

Next, the operation of the rotary solenoid 10 structured in the above-mentioned way is hereinafter explained.

Figure 3A:
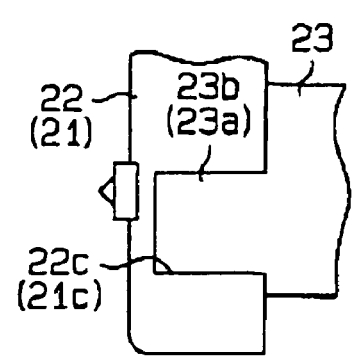
FIGS. 3A and 3B illustrate the operation of the same embodiment.
Figure 3B:
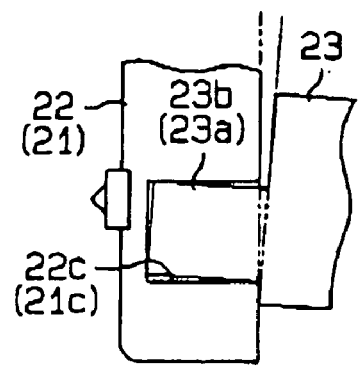

FIGS. 3A and 3B are schemata for explaining the operation of the convex portion 23b formed in the core 23 and the notch 22c formed in the second yoke 22. FIG. 3A illustrates a normal condition for assembling. FIG. 3B illustrates an exaggeratory condition in which distortion is caused in assembling. Here, the operation of the convex portion 23a formed in the core 23 and the notch 21c formed in the first yoke 21 is explained in the same way, thus the operation thereof is not explained herein.

As indicated in FIG. 3A, performance is not affected by touching the second yoke 22 with the core 23 in the event that the second yoke 22 and the core 23 are installed correctly. On the other hand, as indicated in FIG. 3B, a slight gap is caused between the second yoke 22 and the core 23 in the event that the second yoke 22 and the core 23 are installed incorrectly. However, since the second yoke 22 and the core 23 are designed in such a way that the convex portion 23b of the core 23 is inserted into the notch 22c of the second yoke 22, the degradation of contacting area (facing area) of the second yoke 22 and the core 23 can be suppressed and actual performance degradation can be suppressed better than the case where a gap is caused in a shape indicated by a two-dot chain line of FIG. 3B, for example.

Further, FIG. 4 is a schema for explaining the function of the projecting portions 26a of the above-mentioned mounting pads 26 in the event that the resin case 11 is formed by resin-molding the second yoke 22 and the core 23 which the coil 25 is wound around. As indicated in the same drawing, the first and second yokes 21 and 22 seize the core 23 and a cylindrical portion 31 having an outer circumferential surface corresponding to an inner circumferential surface of the above-mentioned circular arc portions 21d and 22d and formed in a lower die, not shown in the drawing, and are placed between an upper die and the lower die. In such a positioned condition, the projecting portions 26a are pressed by slide dies 32 and 33 and the first yoke 21 and the second yoke 22 are pressed toward the cylindrical portion 31 and the core 23. In this case, such a contact condition becomes secure by pressing the first and second yokes 21 and 22 toward the core 23 by crush-pressing the projecting portions 26a. Further, the dimension of placing the circular arc portions 21d and 22d can be stabilized by pressing the first and second yokes 21 and 22 toward the cylindrical portion 31 by crush-pressing the projecting portions 26a. Then, the resin case 11 is formed by resin-molding under the condition of positioning securely in such a way, and the above-mentioned first and second yokes 21 and 22 and the core 23 which the coil 25 was wound around are integrated.

Accordingly, the first and second yokes 21 and 22 and the core 23 contact securely and thus performance is stabilized. Further, the dimension of placing the circular arc portions 21d and 22d is stabilized and the size of the air gap for the rotor 24 is maintained uniformly and thus quality and performance can be stabilized.

As already explained in detail, according to the present embodiment, the following advantageous points can be obtained.

(1) The present embodiment has the projecting portions 26a made of the resin material in the outer side on the opposite side of enclosing the core 23 of the first and second yokes 21 and 22. In the event that the first yoke 21, the second yoke 22, the core 23, and the coil 25 are resin-molded, the above-mentioned first yoke 21 and the above-mentioned second yoke 22 are pressed toward the above-mentioned core 23 and the cylindrical portion 31 by crush-pressing the projecting portions 26a using the slide dies 32 and 33 while the above-mentioned core 23 is seized using the first and second yokes 21 and 22. Accordingly, in the event that the first yoke 21, the second yoke 22, the core 23, and the coil 25 are resin-molded, the power applied to these parts can be suppressed. Then, the first yoke 21, the second yoke 22, and the core 23 can be contacted securely and performance can be stabilized. Further, since the first yoke 21 and the second yoke 22 can be positioned securely using the core 23 and the cylindrical portion 31, the relative position among the above-mentioned rotor 24, the first yoke 21, and the second yoke 22 can be stabilized, thus performance can be stabilized by keeping the air gap uniformly.

(2) According to the present embodiment, the above-mentioned projecting portions 26a are securely set in the required position of the above-mentioned first yoke 21 and the above-mentioned second yoke 22 since the mounting pads 26 are installed in the mounting grooves 21e, 21f, 22e, and 22f formed in the above-mentioned first yoke 21 and the above-mentioned second yoke 22. Accordingly, the first yoke 21 and the second yoke 22 are pressed toward the side of the above-mentioned core 23 by pressure from the specified position of slide dies 32 and 33 via the projecting portions 26a when the above-mentioned resin-mold process is executed.

(3) In the present embodiment, the above-mentioned projecting portions 26a provided in the above-mentioned first yoke 21 and the above-mentioned second yoke 22 are set in order for the straight line L1 for connecting them to pass through nearly the center of the above-mentioned rotor 24 (cylindrical portion 31). Accordingly, the first yoke 21 and the second yoke 22 are pressed toward the side of the above-mentioned core 23 by the power nearly symmetrical with respect to the above-mentioned cylindrical portion 31 (rotor 24) by pressure of the slide dies 32 and 33 via the projecting portions 26a when the above-mentioned resin-mold process is executed. Then, the relative position among the first yoke 21, the second yoke 22, and the above-mentioned rotor 24 can be further stabilized.

(4) According to the present embodiment, the above-mentioned projecting portions 26a provided in the above-mentioned first yoke 21 and the above-mentioned second yoke 22 are arranged in such a way that the straight line L2 for connecting them can pass through the above-mentioned core 23 along the direction of seizing the above-mentioned core 23. Accordingly, the first yoke 21 and the second yoke 22 are pressed toward the side of the core 23 nearly along the direction of seizing the above-mentioned core 23 by pressure of the slide dies 32 and 33 via the projecting portions 26a when the above-mentioned resin-mold process is executed. Then, the first yoke 21, the second yoke 22, and the core 23 can be contacted further securely with each other.

(5) In the present embodiment, the notches 21c and 22c are formed in the above-mentioned first yoke 21 and the above-mentioned second yoke 22 and the convex portions 23a and 23b are formed in the above-mentioned core 23. Therefore, in the event that positional distortion is caused among the first yoke 21, the second yoke 22, and the core 23 seized between them when the first yoke 21, the second yoke 22, the core 23, and the coil 25 are resin-molded, the degradation of area for contacting the first yoke 21, the second yoke 22, and the core 23 can be suppressed by the above-mentioned notches 21c and 22c and the above-mentioned convex portions 23a and 23b.

(5) In the present embodiment, an unstable condition, in the rotating direction, of the core 23 toward the first yoke 21 and the second yoke 22 can be suppressed by providing respective two flat-face widths for the convex portions 23a and 23b, thus gaps among the outside surfaces of the convex portions 23a and 23b and the inside surfaces of the notches 21c and 22c can be lessened.

Here, the embodiment of the present invention is not limited to the above-mentioned embodiment but can be modified in the following way.

Although the core 23 having the convex portions 23a and 23b having respective two flat-face widths is utilized in the above-mentioned embodiment, a core 41 having the convex portions 41a and 41b having respective one-flat surfaces as shown in FIGS. 6A and 6C may be utilized. In this case, the man-hour of processing the core can be decreased since the number of notches of the convex portions 41a and 41b is decreased.

Although the core 23 formed nearly into the cylindrical shape is utilized in the above-mentioned embodiment, a core 42 formed nearly into a square pole shape as shown in FIGS. 7A and 7C may be utilized. In this case, convex portions 42a and 42b having respective two flat-face widths in one side and the other side (right and left sides of FIG. 7A) of the core 42 are formed. In this case, area for contacting with the convex portions 42a and 42b and the first and second yokes 21 and 22 (notches 21c and 22c) can be larger than nearly a cylindrical core. Further, an unstable condition, in the rotating direction, of the core 42 can be suppressed for the first and second yokes 21 and 22 by utilizing the convex portions 42a and 42b having respective two flat-face widths, thus gaps among the outside surfaces of the convex portions 42a and 42b and the inside surfaces of the notches 21c and 22c can be lessened.

In another way, even if such a case is employed, only one-flat portion may be formed in a convex portion, in the same way as the embodiment of FIGS. 6A and 6C. In this case, the man-hour of processing the core can be decreased since the number of notches for the convex portion is decreased.

In the above-mentioned embodiment, the core may be nearly a cylindrical shape so as to be uniform in the axial line direction. That is to say, the end portion of the core can be purely utilized as the projecting portion. Then, this core may be engaged (insertion) with a concave portion having nearly a cylindrical shape having a bottom formed in the first and second yokes. In this case, area for touching the core end portions with the first and second yokes (concave portions) can be kept maximally.

In the above-mentioned embodiment, although the convex portions are formed in the core and the notches (concave portions) are formed in the first and second yokes, they may be formed in a contrary manner with each other. That is to say, the notches (concave portions) may be formed in the core and the convex portions may be formed in the first and second yokes.

Although the projecting portion 26a is formed into the conical shape in the preferred embodiment, it may be formed into a pyramid shape. Further, the projecting portion 26a may be formed in a cylindrical shape or in a polygonal column.

Although the projecting portions 26a are formed in the first and second yokes 21 and 22 by installing the mounting pads 26 in the mounting grooves 21e, 21f, 22e, and 22f in the preferred embodiment, the projecting portions 26a (and the mounting pads 26) may be formed in the first and second yokes 21 and 22 using the resin mold, for example.

The arrangement of the mounting pads 26 (projecting portions 26a) is exemplified in the preferred embodiment as one example, but they may be arranged in other positions.

The coil 25 may be wound around a bobbin inserted in the core 23, although it is not referred especially in the preferred embodiment.

Although the projecting portions are made of resin material in the preferred embodiment, they may be structured by providing the projecting portions directly in the yokes or an elastic body such as rubber.

As explained in the foregoing, performance can be stabilized according to the present invention.

In light of foregoing, according to an aspect of the present invention, a rotary solenoid includes a first engaging portion provided in each of the above-mentioned projecting portions and a second engaging portion for engaging with the above-mentioned first engaging portion formed in the above-mentioned first yoke and the above-mentioned second yoke.

According to still further aspect of the present invention a rotary solenoid includes each of the above-mentioned projecting portions provided in the above-mentioned first yoke and the above-mentioned second yoke placed in a position where a straight line for connecting two of the above-mentioned projecting portions passes through nearly a center of the above-mentioned rotor.

According to further aspect of the present invention, a rotary solenoid includes each of the above-mentioned projecting portions provided in the above-mentioned first yoke and the above-mentioned second yoke placed in a position where a straight line for connecting two of the above-mentioned projecting portions passes through the above-mentioned core nearly along a direction of seizing the above-mentioned core.

According to further aspect of the present invention, a rotary solenoid includes one of a concave portion and a convex portion capable of being inserted in the above-mentioned concave portion formed in the above-mentioned first yoke and the above-mentioned second yoke and the other one of the above-mentioned concave portion and the above-mentioned convex portion is formed in the above-mentioned core.

According to the present invention each of projecting portions is provided in each outer surface on the opposite side of enclosing the above-mentioned core by the above-mentioned first yoke and the above-mentioned second yoke. The first yoke, the second yoke, the core, and the coil are resin-molded by pressing the first yoke, the second yoke, the core, and the coil to the above-mentioned core side by crushing the projecting portions using slide dies while the core is seized by the first and second yokes. Accordingly, in the event that the first yoke, the second yoke, the core, and the coil are resin-molded, the excessive pressure power applied to them can be reduced. Then the first yoke and the second yoke can be contacted securely, thus performance can be-stabilized. Further, each relative position of the first yoke, the second yoke, and the above-mentioned rotor is stably decided, thus performance can be stabilized since an air gap is maintained uniformly.

According to the present invention, the first engaging portion is provided in each of the above-mentioned projecting portions and the second engaging portion for engaging with the above-mentioned first engaging portion is formed in the above-mentioned first yoke and the above-mentioned second yoke. Accordingly, the above-mentioned projecting portions can be provided securely in the designated positions of the above-mentioned first yoke and the above-mentioned second yoke since the first and second engaging portions engage securely. Thus, the first yoke and the second yoke are pressed to the above-mentioned core side by pressure via the projecting portion from the prescribed position of the slide die when resin-mold process is executed.

According to the present, each of said projecting portions provided in the above-mentioned first yoke and the above-mentioned second yoke is placed in a position where a straight line for connecting two of the above-mentioned projecting portions passes through nearly a center of said rotor. Accordingly, the first yoke and the second yoke are pressed to the core side by symmetrical pressure force with respect to the above-mentioned rotor by pressure of the slide dies (actually, the dies for deciding a relative position from the rotor after resin-molding) via the projecting portions when the above-mentioned resin-mold process is executed. Then, each relative position of the first yoke, the second yoke, and the above-mentioned rotor is further stably decided.

According to the present invention, each of the above-mentioned projecting portions provided in the above-mentioned first yoke and the above-mentioned second yoke is placed in a position where a straight line for connecting two of the above-mentioned projecting portions passes through the above-mentioned core nearly along a direction of seizing the above-mentioned core. Accordingly, the first yoke and the second yoke are pressed to the core side nearly along the direction of seizing the above-mentioned core by pressure of the slide dies via the projecting portions when the above-mentioned resin-mold process is executed. Then, the first yoke, the second yoke, and the core contact securely.

According to the present invention, one of a concave portion and a convex portion capable of being inserted in the above-mentioned concave portion is formed in the above-mentioned first yoke and the above-mentioned second yoke and the other one of the above-mentioned concave portion and the above-mentioned convex portion is formed in the above-mentioned core. Thus, even if positional deviation is caused among the first yoke, the second yoke, and the core seized by them, when the first yoke, the second yoke, the core, and the coil are resin-molded, degradation of area for touching the first yoke, the second yoke, and the core can be suppressed, and performance degradation can be suppressed.

What is claimed is:

1. A rotary solenoid comprising
a first yoke and a second yoke placed oppositely;
a rotor disposed between the first yoke and the second yoke, and providing a pair of magnetic poles by a permanent magnet;
a core seized by the first yoke and the second yoke;
the first yoke and the second yoke each possessing one side facing the core;
a coil wound around the core and forming a pair of magnetic poles in the first yoke and the second yoke upon supplying electricity;
the first yoke, second yoke, core, and coil being resin-molded;
a projecting portion provided at an outer surface of the first yoke and at an outer surface of the second yoke, the outer surface of the first yoke being positioned on an opposite side of the first yoke from said one side of the first yoke, the outer surface of the second yoke being positioned on an opposite side of the second yoke from said one side of the second yoke; and
a first engaging portion provided in each of said projecting portions, and a second engaging portion formed in said first yoke and said second yoke for engaging one of said first engaging portions.

2. A rotary solenoid as set forth in claim 1, wherein:
each of said projecting portions provided in said first yoke and said second yoke is placed in a position where a straight line for connecting two of said projecting portions passes through nearly a center of said rotor.

3. A rotary solenoid as set forth in claim 1, wherein:
each of said projecting portions provided in said first yoke and said second yoke is placed in a position where a straight line for connecting two of said projecting portions passes through said core nearly along a direction of seizing said core.

4. A rotary solenoid as set forth in claim 1, wherein:
one of a concave portion and a convex portion capable of being inserted in said concave portion is formed in said first yoke and said second yoke; and the other one of said concave portion and said convex portion is formed in said core.

5. A rotary solenoid as set forth in claim 2, wherein:
one of a concave portion and a convex portion capable of being inserted in said concave portion is formed in said first yoke and said second yoke; and the other one of said concave portion and said convex portion is formed in said core.

6. A rotary solenoid as set forth in claim 3, wherein:
one of a concave portion and a convex portion capable of being inserted in said concave portion is formed in said first yoke and said second yoke; and the other one of said concave portion and said convex portion is formed in said core.

7. A rotary solenoid comprising:
a first yoke and a second yoke placed oppositely;
a rotor disposed between the first yoke and the second yoke, and providing a pair of magnetic poles by a permanent magnet;
a core seized by the first yoke and the second yoke;
a coil wound around the core and forming a pair of magnetic poles in the first yoke and the second yoke upon supplying electricity;
the first yoke, second yoke, core, and coil being resin-molded
one of a concave portion and a convex portion capable of being inserted in said concave portion is formed in said first yoke and said second yoke; and
the other one of said concave portion and said convex portion is formed in said core.

8. A rotary solenoid as set forth in claim 7, wherein:
said core has a square pole shape.

9. A rotary solenoid as set forth in claim 8, wherein:
two flat-face widths are formed in each of right and left end portions of said core.

10. A rotary solenoid as set forth in claim 8, wherein:
one flat-face width is formed in each of right and left end portions.

11. A rotary solenoid as set forth in claim 8, wherein:
said core is formed into a cylindrical shape.

12. A rotary solenoid comprising:
a first yoke and a second yoke placed oppositely;
a rotor disposed between the first yoke and the second yoke, and providing a pair of magnetic poles by a permanent magnet;
a core seized by the first yoke and the second yoke;
the first yoke and the second yoke each possessing one side facing the core that is seized by the first and second yokes;
a coil wound around the core and forming a pair of magnetic poles in the first yoke and the second yoke upon supplying electricity;
the first yoke, second yoke, core, and coil being resin-molded;
a projecting portion provided at an outer surface of the first yoke and at an outer surface of the second yoke, the outer surface of the first yoke being positioned on an opposite side of the first yoke from said one side of the first yoke, the outer surface of the second yoke being positioned on an opposite side of the second yoke from said one side of the second yoke;
one of a concave portion and a convex portion capable of being inserted in said concave portion is formed in said first yoke and said second yoke; and
the other one of said concave portion and said convex portion is formed in said core.

13. A rotary solenoid as set forth in claim 12, wherein:
each of said projecting portions is formed in said first yoke and said second yoke by installing each mounting pad in each mounting groove.

14. A rotary solenoid as set forth in claim 12, wherein:
each of said projecting portions is structured directly in an elastic body.

* * * * *